(12) United States Patent
Jordan

(10) Patent No.: US 6,953,404 B2
(45) Date of Patent: Oct. 11, 2005

(54) GOLF BALL

(75) Inventor: Michael D Jordan, East Greenwich, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/767,181

(22) Filed: Jan. 29, 2004

(65) Prior Publication Data

US 2004/0192472 A1 Sep. 30, 2004

Related U.S. Application Data

(63) Continuation of application No. 10/002,051, filed on Nov. 15, 2001, now abandoned.

(51) Int. Cl.$^7$ ............................................... A63B 37/12
(52) U.S. Cl. ..................................................... 473/378
(58) Field of Search .................................. 473/351, 378

(56) References Cited

U.S. PATENT DOCUMENTS

| | | | |
|---|---|---|---|
| 4,431,193 A | * 2/1984 | Nesbitt | 473/374 |
| 5,252,652 A | * 10/1993 | Egashira et al. | 524/392 |
| 5,588,924 A | 12/1996 | Sullivan et al. | 473/377 |
| 5,703,166 A | * 12/1997 | Rajagopalan et al. | 525/196 |
| 6,142,886 A | 11/2000 | Sullivan et al. | 473/371 |
| 6,218,453 B1 | 4/2001 | Boehm et al. | 524/433 |
| 6,220,972 B1 | * 4/2001 | Sullivan et al. | 473/374 |
| 6,350,793 B1 | * 2/2002 | Kennedy et al. | 522/153 |
| 6,422,953 B1 | 7/2002 | Nesbitt et al. | 473/376 |
| 6,435,983 B2 | 8/2002 | Kennedy et al. | 473/371 |

* cited by examiner

Primary Examiner—Raeann Gorden
(74) Attorney, Agent, or Firm—William B. Lacy

(57) ABSTRACT

A golf ball with a center and a cover layer formed over the center is disclosed. The center exhibits a high velocity and is soft with a compression of less than about 75. The cover layer is soft with a Shore D hardness on the ball of less than about 58. The cover layer includes an ionomer component and a metallocene polymer component. The ionomer component can be a single ionomer or a blend of ionomers. The metallocene polymer component can be a single metallocene polymer or a blend of metallocene polymers.

16 Claims, 1 Drawing Sheet

GOLF BALL

CROSS REFERENCE TO RELATED APPLICATIONS

This application is a continuation of U.S. application Ser. No. 10/002,051, filed Nov. 15, 2001 now abandoned.

FIELD OF THE INVENTION

The present invention relates to golf balls and more particularly, the invention is directed to improved golf balls including a soft, high-velocity core and a surrounding soft cover layer comprising an ionomer component and a metallocene polymer component.

BACKGROUND OF THE INVENTION

Conventional golf balls can be divided into two general types or groups: solid balls or wound balls. The difference in play characteristics resulting from these different constructions can be quite significant. These balls, however, have primarily two functional components that make them work. These components are the center or core and the cover. The primary purpose of the core is to be the "engine" of the ball or the principal source of resiliency. The primary purpose of the cover is to protect the core.

Two-piece solid balls are made with a single-solid core, usually made of a crosslinked polybutadiene or rubber, which is encased by a cover material. These balls are typically the least expensive to manufacture as the number of components is low and these components can be formed by relatively quick, automated molding techniques. In these balls, the solid core is the "engine" or source of resiliency. The resiliency of the core can be increased by increasing the crosslink density of the core material. As the resiliency increases, however, the compression also increases making a harder ball, which is undesirable.

Polybutadiene cores in solid balls are adversely affected by moisture, and to protect against moisture their covers should have good moisture barrier properties and should be applied to the cores soon after their formation. One way to achieve a desirable golf ball is to cover a high-velocity polybutadiene core with a urethane cover. This type of golf ball exhibits low driver spin and high velocity for distance with high half-wedge spin for control around the greens. Since urethane lacks optimal moisture barrier properties, a polybutadiene core of such a two-piece ball, however, can lose its high velocity quickly, which is undesirable. As a result, balls with polybutadiene cores and urethane covers may include an intermediate layer for moisture control.

High velocity cores have also been covered with blends of low modulus ionomers, which offer better moisture barrier properties than urethane. These covers, however, lack resiliency so that the desired ball velocity is not achieved.

Hence, there remains a need for a two-piece ball design that provides a soft, high-velocity core and a surrounding soft cover layer for low driver spin with high velocity and high half-wedge spin while also having good moisture barrier characteristics.

SUMMARY OF THE INVENTION

The present invention is directed to a two-piece golf ball with a center and at least one cover layer surrounding the center. The inventive golf ball provides low driver spin and high velocity with high half-wedge spin. The inventive gall also exhibits good moisture barrier characteristics.

According to one embodiment of the present invention, the golf ball includes a soft center and a soft cover layer. The center has a compression of less than about 75. More preferably, the compression of the center is between about 63 and about 73. The cover layer has a Shore D hardness less than about 58 on the ball. Preferably, the cover layer is formed of an ionomer component and a metallocene polymer component. The ionomer component can be a single ionomer or a blend of ionomers. The metallocene polymer component can be a single metallocene polymer or a blend of such polymers.

According to one aspect of the present invention, the center has a diameter greater than about 1.50 inches. More preferably, the center has a diameter between about 1.55 inches and about 1.60 inches.

According to another aspect of the present invention, the cover layer has a Shore D hardness on the ball of less than about 55. More preferably, the cover layer has a Shore D hardness on the ball of between about 50 and about 52.

According to another feature of the present invention, the cover layer includes about 50% to about 70% of the ionomer component and about 50% to about 30% of the metallocene polymer component. More preferably, the cover layer includes about 60% of the ionomer component and about 40% of the metallocene polymer component.

In yet another embodiment, the golf ball comprises the center and at least one cover layer surrounding the center. The center has a compression of about 63. The cover layer is formed of an ionomer component and a metallocene polymer component, and the cover layer has a Shore D hardness on the ball less than about 58.

According to one aspect of the present inventive ball, the compression of the golf ball is greater than about 70. More preferably, the compression of the golf ball is between about 74 and about 80.

In one embodiment, the center includes polybutadiene, zinc diacrylate, peroxide, a filler, and zinc oxide. In such a ball, the center may include a polybutadiene with a Mooney viscosity between about 40 and about 60. The center may also include a polybutadiene blend of a first and second polybutadiene, the first polybutadiene having a Mooney viscosity between about 30 and about 50 and the second polybutadiene having a Mooney viscosity between 50 and about 70. If the zinc diacrylate is greater than 30 pph of the polybutadiene, the center may further include organic sulfur. If the zinc diacrylate is less than 30 pph of the polybutadiene, the center may omit organic sulfur. The filler may be a high specific gravity material such as tungsten, barium sulfate, tungsten trioxide, iron, magnesium, or manganese.

Another embodiment of the present invention is a two-piece golf ball comprising a center with a compression of less than about 75 and a single cover layer surrounding the center. The cover layer is formed of a lithium ionomer and a metallocene polymer. The cover layer has a Shore D hardness less than about 58 on the ball.

According to one aspect of such a golf ball, the center may include only a single layer. According to another aspect of such a golf ball, the center can be adjacent the cover layer so that the ball does not include an intermediate layer between the center and cover layer.

BRIEF DESCRIPTION OF THE DRAWING

In the accompanying drawing which forms a part of the specification and is to be read in conjunction therewith.

DETAILED DESCRIPTION OF THE INVENTION

Figure 1:
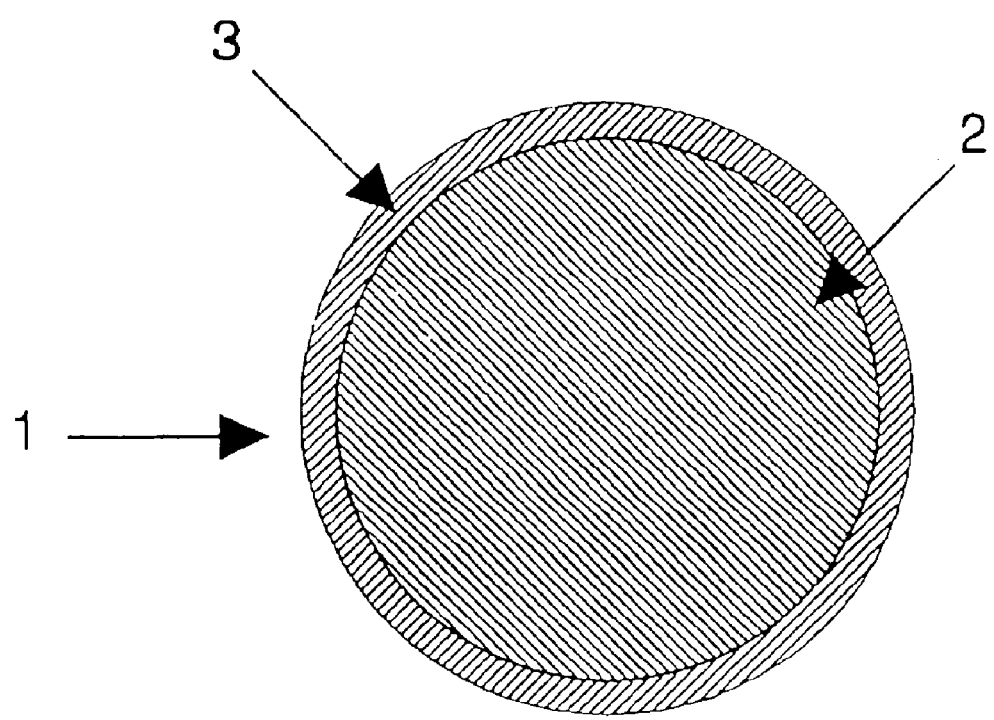
FIG. 1 is a cross-sectional view of a two-piece golf ball according to the present invention.

Referring to FIG. 1, golf ball 1 is shown. Golf ball 1 includes a center 2 surrounded by at least one cover layer 3, which forms the outer surface of the golf ball. Preferably, in the golf ball 1, there is only a single center 2 and only a single cover layer 3. The cover layer 3 is preferably formed of a blend of at least one ionomer and at least one metallocene polymer.

The center 2 may be of any dimension or composition, so long as it has a compression of less than about 75. More preferably, the compression of the center is between about 63 and about 73. The compression measurement can be obtained using a commercial compression tester manufactured and sold by ATTI Engineering in New Jersey. Preferably, the center 2 has a diameter greater than about 1.50 inches, more preferably has a diameter between about 1.55 inches and about 1.60 inches, and most preferably between about 1.55 inches and about 1.59 inches.

Preferably, the center 2 is formed of a resilient polymer base material, such as polybutadiene, natural rubber, polyisoprene, styrene-butadiene, or ethylene-propylene-diene rubber. This base material may be combined with other components. A preferred base composition for forming the golf ball center 2 prepared in accordance with the present invention generally comprises polybutadiene and, in parts by weight based on 100 parts polybutadiene, about 22 parts per hundred (pph) to about 35 pph of a metal salt diacrylate, dimethacrylate, or monomethacrylate, preferably zinc diacrylate (ZDA), a free radical initiator, zinc oxide, and filler.

The polybutadiene preferably has a cis 1,4 content of above about 90% and more preferably above about 96%. In addition, the polybutadiene preferably has a mid-Mooney viscosity. Mid-Mooney viscosity is between about 40 and about 60. Mooney viscosity is typically measured according to ASTM D-1646.

Commercial sources of useful polybutadiene include CB 23, which has a Mooney viscosity of about 51, and is a highly linear polybutadiene rubber sold by Bayer. If desired, the polybutadiene can also be mixed with other elastomers known in the art, such as natural rubber, styrene-butadiene, low Mooney viscosity polybutadiene (i.e., with a Mooney viscosity of less than 40) and/or isoprene in order to further modify the properties of the center. Preferable low Mooney viscosity polybutadienes include Shell 20 and Ubepol 130B manufactured by Shell and EniChem, respectively. When a mixture of elastomers is used, the amounts of other constituents in the base material are based on 100 parts by weight of the total elastomer mixture.

Metal salt diacrylates, dimethacrylates, and monomethacrylates suitable for use in this invention include those wherein the metal is magnesium, calcium, zinc, aluminum, sodium, lithium, zinc, or nickel. ZDA is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing between about 4% and about 8% zinc stearate. Suitable, commercially available zinc diacrylates include those from Rockland React-Rite and Sartomer. The preferred concentrations of ZDA that can be used are about 25 pph to about 35 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy)3,3,5-trimethyl cyclohexane, bis(t-butylperoxy)diisopropylbenzene, 2,5-dimethyl-2,5 di(t-butylperoxy)hexane, or di-t-butyl peroxide, and mixtures thereof. Other useful initiators would be readily apparent to one of ordinary skill in the art without any need for undue experimentation. The initiator(s) at between about 70% and about 100% activity are preferably added in an amount ranging between about 0.05 pph and about 2.5 pph based upon 100 parts of butadiene, or butadiene mixed with one or more other elastomers. More preferably, the amount of initiator added ranges between about 0.15 pph and about 2 pph, and most preferably the amount of initiator added between about 0.25 pph and about 1.5 pph. Suitable commercially available dicumyl peroxides include Perkadox BC, which is a 90% active dicumyl peroxide, and DCP 70, which is a 70% active dicumyl peroxide. The present invention further includes between about 5 pph to about 50 pph zinc oxide in the ZDA-peroxide cure system that crosslinks the polybutadiene during the core molding process.

When the amount of zinc diacrylate is greater than about 30 pph, then a plasticizer, such as organic sulfur can be added to the center composition. On the other hand, when the amount of zinc diacrylate is less than about 30 pph, then the composition may omit the plasticizer or organic sulfur. In accordance to another aspect of the invention, the addition of an organic sulfur compound to the center further increases the resiliency and the coefficient of restitution of the ball even at low compressions. Preferred organic sulfur compounds include, but are not limited to, pentachlorothiophenol ("PCTP") and a salt of PCTP. A preferred salt of PCTP is ZnPCTP. The utilization of PCTP and ZnPCTP in golf ball cores to produce soft and fast cores is disclosed in co-pending U.S. application Ser. No. 09/951,963 filed on Sep. 13, 2001, and is assigned to the same assignee as the present invention. This co-pending application is incorporated by reference herein, in its entirety. A suitable PCTP is sold by the Struktol Company under the tradename A95. ZnPCTP is commercially available from EchinaChem.

The center compositions of the present invention preferably include fillers, added to the elastomeric composition to adjust the density and/or specific gravity of the center. As used herein, the term "fillers" includes any compound or composition that can be used to vary the density and other properties of the subject golf ball core. Appropriate fillers preferably used range in specific gravity from about 5 to about 19, preferably from about 2 to about 5.6. Fillers useful in the golf ball core according to the present invention include, for example, metal (or metal alloy) powders, metal oxide, metal stearates, particulate, carbonaceous materials, and the like or blends thereof. The amount and type of filler utilized is governed by the amount and weight of other ingredients in the composition, since a maximum golf ball weight of 1.620 ounces has been established by the United States Golf Association ("USGA").

Examples of useful metal (or metal alloy) powders include, but are not limited to, bismuth powder, boron powder, brass powder, bronze powder, cobalt powder, copper powder, inconel metal powder, iron metal powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include but are not limited to zinc oxide, iron oxide, aluminum oxide, titanium dioxide, magnesium oxide, zirconium oxide, and tungsten trioxide. Examples of particulate carbonaceous materials include but are not limited to graphite and carbon black. Examples of other useful fillers include but are not limited to graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, regrind (which is recycled uncured center material mixed and ground to 30 mesh particle size), manganese powder, and magnesium powder.

Antioxidants may also be included in the elastomeric centers produced according to the present invention. Antioxidants are compounds that prevent the breakdown of the elastomer. Antioxidants useful in the present invention include, but are not limited to, quinoline type antioxidants, amine type antioxidants, and phenolic type antioxidants.

Other ingredients such as accelerators, e.g. tetra methylthiuram, processing aids, processing oils, dyes and pigments, as well as other additives well known to one of ordinary skill in the art may also be used in the present invention in amounts sufficient to achieve the purpose for which they are typically used.

The center 2 may be formed by mixing and forming the base composition using conventional techniques. More particularly, the center compositions of the invention are produced by forming a mixture comprising polybutadiene, zinc diacrylate, the plasticizer, if used, zinc oxide, and filler. When a set of predetermined conditions is met, i.e., time and temperature of mixing, the free radical initiator is added. In particular, as the components are mixed, the resultant shear causes the temperature of the mixture to rise.

After completion of the mixing, the golf ball center composition is milled and hand prepped or extruded using a machine into pieces "preps" suitable for molding. The milled preps are then compression molded into centers at an elevated temperature. Typically, about 160° C. (320° F.) for approximately 15 minutes at about 2000 psi is suitable for molding the center. These centers can then be used to make finished golf balls by surrounding the centers with cover materials.

Referring to FIG. 1, the cover layer 3 can be formed with a plurality of dimples (not shown) defined thereon. Preferably, the thickness of the cover layer is between about 0.020 inches and about 0.07 inches, more preferably between about 0.03 inches and about 0.065 inches, and most preferably between about 0.045 inches and about 0.065 inches. In addition, the preferred cover layer 3 is formed of a blend of at least one ionomer resin and one or more metallocene polymers such that the cover layer has a Shore D hardness on the ball of less than about 60 and greater than about 48. More preferably, the Shore D hardness on the ball is less than about 58, and most preferably the Shore D hardness of the cover material on the ball is between about 50 and about 52. If the cover material is measured prior to placement on the center, it is in a slab, and Shore D hardness off the ball is preferably less than about 50. More preferably, the Shore D hardness off the ball is between about 42 and about 48. Shore D hardness off the ball is measured in accordance with ASTM D 2240-86 durometer hardness.

In such a cover layer, preferably, the ionomer or ionomer blend forms an ionomer component that is between about 50% and about 70% of the cover material. Preferably, the metallocene polymer or blend of such polymers forms a metallocene polymer component that is between about 50% and about 30% of the cover material. More preferably, the ionomer component forms about 60% of the cover material and the metallocene polymer component forms about 40% of the cover material. According to one aspect of the present invention, the ionomer component can be formed of a single ionomer or blend of ionomers and similarly the metallocene component can be formed of a single metallocene polymer or a blend of metallocene polymers in various combinations. Advantageously, the ionomer-metallocene blend used for the cover exhibits a lower water vapor transmission rate than a thermoset urethane material. The typical Water Vapor Transmission Rate "WVTR" values for some ionomer and some urethane materials are about 0.2870 g/100 in$^2$-day and about 12.62 g/100 in$^2$-day, respectively. Each WVTR is measured at 37.8° C. and 100% relative humidity.

Exemplary ionomers useful in the inventive ball are ethylene methacrylic acid ionomers, and ethylene acrylic acid ionomers, and their terpolymers, currently sold commercially under the trade names SURLYN® and IOTEK® by DuPont and Exxon, respectively. These and other polymers and ionomers are described in U.S. Pat. No. 5,155,157 and Canadian Patent No. 963,380. Other polymers which can be used in conjunction with the ethylene metallocene catalyzed polymers of the claimed invention in golf ball covers include: poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly-1,1-bis(trifluoromethoxy)difluoroethylene, poly(methoxyethylene), poly(pentyloxyethylene), poly(1,1-dichloroethylene), poly(cyclopentylacetoxyethylene), poly(4-(2-butoxyethoxy)methyl-styrene), poly(4-dodecylstyrene), poly(4-tetradecylstyrene), poly(phenetylmethylethylene), polyoxy(allyloxymethyl)ethylene, polyoxy(ethoxymethyl)ethylene, poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(oxy-2,2,3,3,4,4-hexafluoropentamethyleneoxyadipoyl), polyoxy(methyl)-3,3,3-trifluoropropylsilylene-3,3-difluoropentamethylene (methyl)-3,3,3-trifluoropropylsilylene, poly(silanes) and poly(silazanes), main-chain heterocyclic polymers and poly(furan tetracarboxylic acid diimides) as well as the classes of polymers to which they belong.

Preferably, the ionomer is selected from a group of ionomers including sodium, lithium, zinc or magnesium ionomer resins or blends thereof. Such blends can include two of the above ionomer resins or all three ionomer resins. In a preferred embodiment, the ionomer component is a thermoplastic, lithium ionomer resin, such as SURLYN®, which is commercially available from DuPont. The preferred golf ball compositions comprise one or more ionomer resins having a flexural modulus of from about 50 psi to about 150,000 psi and a non-ionic metallocene catalyzed copolymer of an olefin having a flexural modulus of from about 500 psi to 200,000 psi. Flexural modulus is measured according to ASTM 6272-98. The test specimen should be conditioned for a period of at least two weeks.

As used herein, the term "metallocene polymer" refers to any polymer, copolymer, or terpolymer useful in the present invention that is formed using metallocene catalyst technology. Preferably, the metallocene catalyzed polymers have the formula:

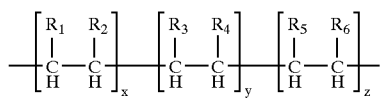

wherein $R_1$ is hydrogen, branched or straight chain alkyl such as methyl, ethyl, propyl, butyl, pentyl, hexyl, heptyl, and octyl, carbocyclic, aromatic or heterocyclic;

$R_2$ is hydrogen, lower alkyl including $C_1$–$C_5$; carbocyclic, aromatic or heterocyclic $R_3$ is hydrogen, lower alkyl including $C_1$–$C_5$, carbocyclic, aromatic or heterocyclic;

$R^4$ is selected from the group consisting of $C_nH_{2n+1}$, for n=1 to 18 (which includes $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$) and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x, y and z are the relative percentages of each co-monomer. The number x can range from 1–99 percent or more preferably from 10–70 percent and most preferred, from about 10–50 percent. The number y can be from 99–1 percent, preferably, from 90–30 percent, or most preferably, 90–50 percent. The number z can range from 0 to 49 percent, as disclosed in U.S. Pat. No. 5,703,166 incorporated herein by reference in its entirety.

Residual metallocene catalyst may also be present in the subject composition as these catalysts are used in the manufacture of the metallocene catalyzed co-polymers that are useful in the golf ball cover compositions of the present inventive ball.

In the preferred metallocene catalyzed copolymer, $R_1$ is hydrogen or lower alkenyl, $R_2$ is hydrogen or alkyl, including carbon chains having from 1 to 10 carbon atoms, $R_3$ is hydrogen or lower alkyl or alkenyl such as carbon chains having 1–10 carbon atoms, and $R_4$ is a lower alkyl group having from 1–10 carbon atoms. For terpolymers, where z is not zero, $R_5$ is preferably hydrogen or lower alkyl or alkenyl such as carbon chains having 1–10 carbon atoms, and $R_6$ is a lower alkyl group having from 1–10 carbon atoms. In the most preferred copolymer, $R_1$ and $R_2$ are hydrogen, $R_3$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

The subject metallocene catalyzed copolymers can be random or block copolymers and may be made by blending two, three, four, five or more different monomers according to processes well known to one of ordinary skill in the art. Additionally, the subject metallocene catalyzed polymers may be isotactic, syndotactic or atactic, or any combination of these forms of types of polymers. The pendant groups creating the isotactic, syndotactic or atactic polymers are chosen to determine the interactions between the different polymer chains making up the resin to control the final properties of the resins used in golf ball covers. Aromatic and cyclic olefins can be used in the present invention as well as such specific groups as methyl and phenyl.

As used herein, the phrase linear chain or branched chained alkyl groups of up to about 30 carbon atoms means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butyldiene, pentene, hexene, heptene, octene, norbomene, nonene, decene and the like. The ordinary skilled artisan is familiar with numerous linear and branched alkyl groups, which are within the scope of the present invention.

In addition, such alkyl group may also contain various substituents in which one or more hydrogen atoms has been replaced by a functional group. Functional groups include but are not limited to hydroxyl, amino, carboxyl, sulfonic amide, ester, ether, phosphates, thiol, nitro, silane and halogen(fluorine, chlorine, bromine and iodine), to mention but a few.

As used herein, substituted and unsubstituted carbocyclic groups of up to about 20 carbon atoms means cyclic carbon-containing compounds, including but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom. For example, in a specific embodiment, $R_2$ is cyclohexanol.

As used herein, substituted and unsubstituted aryl groups means a hydrocarbon ring bearing a system of conjugated double bonds, usually comprising six or more even number of π electrons. Examples of aryl groups include, but are not limited to phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

The metallocene catalyzed copolymers useful in the present invention are commercially available under the trade name AFFINITY® polyolefin plastomers and ENGAGE® polyolefin elastomers by Dow Plastics Company and they are described more fully in U.S. Pat. Nos. 5,272,236 and 5,278,272 which are herein incorporated by reference in their entirety. Other commercially available metallocene catalyzed polymers can be used such as Exxon's EXACT® and Dow's Insight® line of resins which have superior flexibility and clarity as well as toughness. The Exact® and Insight® line of polymers also have novel rheological behavior in addition to their other properties as a result of using a metallocene catalyst technology. The method of making EXACT® and INSIGHT® polymers and their compositions are more fully detailed in U.S. Pat. Nos. 5,359,015 and 5,281,679.

Other polymers may also be used for cover material in golf balls according to the present invention. In particular, any of the polymers that are disclosed in U.S. Pat. Nos. 2,924,593, 5,055,438 and 5,324,800 may be used in golf balls according to the subject invention.

Further components may also be added to the blended cover material, such as, for example; coloring agents, reaction enhancers, crosslinking agents, dyes, lubricants, fillers, excipients, process aids and other compounds commonly added to polymeric materials and/or golf ball covers.

The golf ball cover compositions of metallocene catalyzed polymer(s) blended with the ionomer(s) are formed according to blending methods well known by those of ordinary skill in the art in a conventional manner using conventional equipment. Good results have been obtained by mixing the metallocene catalyzed polymer(s) and ionomer resin(s) in a solid, pelletized form and then placing the mix into a hopper which is used to feed the heated barrel of an injection molding machine. Further mixing is accomplished by a screw in the heated barrel.

The injection molding machine is used either to make preformed half-shells for compression molding about the center or for molding flowable cover stock about center using a retractable-pin mold. Such machines are conventional. The preferred method is compression molding.

Half-shells are made by injection molding cover stock into a conventional half-shell mold in a conventional manner. The preformed half-shells are then placed about the center and the assembly is introduced into a compression molding machine. The compression molding machine is a hydraulic press having an upper and lower mold plate. As taught by U.S. Pat. No. 4,508,309 issued Apr. 2, 1985, such mold plates have half molds, each of which is registered with another half mold in the opposite mold plate. It has been found that a golf ball is formed in accordance with the present invention with a cover layer, when the half-shells are compression molded about the center at about 250° to 400° F. The molded balls are then cooled while still in the mold and finally removed when the cover layer is hard enough to be handled without deforming. After the balls have been molded, they undergo various conventional finishing operations such as buffing, painting and stamping.

The present invention can be used with golf balls of any size. While USGA specifications limit the size of a competition golf ball to more than 1.68 inches in diameter, golf balls of any size can be used for leisure golf play. The preferred diameter of the inventive golf balls is from about 1.68 inches to about 1.80 inches. The more preferred diameter is from about 1.68 inches to about 1.76 inches. A diameter of from about 1.68 inches to about 1.74 inches is most preferred, however diameters anywhere in the range of from 1.70 to about 1.95 inches can be used. Oversize golf balls above about 1.76 inches to golf balls having diameters as big 2.75 inches are also within the scope of the present invention.

These and other aspects of the present invention may be more fully understood by reference to the following examples. While these examples are meant to be illustrative of golf balls made according to the present invention, the present invention is not meant to be limited by the following examples.

TABLE I

| Ingredient(s) | Inventive Center Ex. 1 | Inventive Center Ex. 2 |
| --- | --- | --- |
| Polybutadiene (pph) | 100 | 100 |
| ZDA (pph) | 25.5 | 32 |
| Peroxide (pph) | 0.5 | 0.8 |
| Organic Sulfur (pph) | 0 | 2.35 |
| Zinc Oxide | 5.0 | 5.0 |
| Filler | tungsten | barium sulfate |
| Compression | 73 | 63 |

TABLE I illustrates two inventive center compositions, where the center compression is less than 75. The composition of Inventive Center Example 1 has less than about 30 pph of ZDA and does not contain organic sulfur. The composition of Inventive Center Example 2 has greater than about 30 pph ZDA and does include organic sulfur.

The composition of Inventive Center Example 1 was formed into two balls as described in TABLE II. After completion of the ball molding process, the balls are buffed, sand blasted and painted for evaluation. Compression, velocity, and spin tests are performed on the finished balls. These results are also shown in TABLE II.

TABLE II

| Property | Comparative Ball | Inventive Ball 1 | Inventive Ball 2 |
| --- | --- | --- | --- |
| Core Composition | — | Inventive Center Ex. 1 | Inventive Center Ex. 1 |
| Cover Composition | — | Blend of ionomer and metallocene polymer | Blend of ionomer and metallocene polymer |
| Core Size (inches) | 1.550 | 1.560 | 1.590 |
| Ball Compression | 85 | 77 | 74 |
| Ball velocity (ft/s) | 253.7 | 254.3 | 254.3 |
| Spin Rate - Std. Driver (rpm) | 3293 | 3241 | 3376 |
| Spin Rate - Avg. Driver (rpm) | 3749 | 3813 | 3925 |
| Spin Rate - 8 Iron (rpm) | 7686 | 8041 | 8280 |
| Spin Rate - Half Wedge (rpm) | 7004 | 7241 | 7344 |

| | Ball Speed | Launch Angle | Back Spin |
| --- | --- | --- | --- |
| Std Driver | 160 | 9.5° | 3000 |
| Avg Driver | 140 | 10.5° | 3600 |
| 8 Iron | 115 | 19° | 8200 |
| ½ Wedge | 53 | 31.5° | 6900 |

The golf ball of the Comparative Ball is a Pro V1 ball manufactured by Titleist®. The Inventive Balls 1 and 2 have centers formed according to Inventive Center Example 1 in TABLE I. Inventive Balls 1 and 2 have covers formed of blend of 60% of a lithium ionomer named 7940 manufactured by DuPont and 40% of a metallocene polymer named NMO 525 D manufactured by Fusabond. The Comparative Ball has desirable compression, velocity and spin characteristics. The Inventive Balls 1 and 2 have compressions, velocities and spin characteristics substantially equal to those of the Comparative Ball.

The Inventive Balls 1 and 2 have compressions of 77 and 74, respectively, compared to the Comparative Ball's compression of 85. Hence, the Inventive Balls are as soft or softer than the Comparative Ball.

The Inventive Balls 1 and 2 have velocities of 254.3 ft/s compared to the Comparative Ball's velocity of 253.7 ft/s. Thus, the Inventive Balls are as fast as the Comparative Ball.

The Inventive Balls 1 and 2 have spin rates off the standard driver of 3241 rpm and 3376 rpm, respectively, compared to the Comparative Ball's spin rate off the standard driver of 3293 rpm. Hence, the Inventive Balls have substantially as low a spin off the standard driver as the Comparative Ball.

The Inventive Balls 1 and 2 have spin rates off the average driver of 3813 rpm and 3925 rpm, respectively, compared to the Comparative Ball's spin rate off the average driver of 3749 rpm. Thus, the Inventive Balls have low spin off the driver within about 180 rpm of the Comparative Ball.

The Inventive Balls 1 and 2 have spin rates off the 8 iron of 8041 rpm and 8280 rpm, respectively, compared to the Comparative Ball's spin rate off the 8 iron of 7686 rpm. Thus, the Inventive Balls have a spin off the 8 iron as high or higher than that of the Comparative Ball.

The Inventive Balls 1 and 2 have spin rates off a half wedge of 7241 rpm and 7344 rpm, respectively, compared to the Comparative Ball's spin rate off a half wedge of 7004 rpm. Consequently, the Inventive Balls have a spin off a half wedge as high or higher than that of the Comparative Ball.

As shown above, the Inventive Balls 1 and 2 have good characteristics as they exhibit a high velocity of between about 253 ft/s and 256 ft/s, low spin off the standard driver of less than about 3400 rpm, and high spin off of the half wedge of between about 6500 rpm and 7500 rpm.

While various descriptions of the present invention are described above, it is understood that the various features of the present invention can be used singly or in combination thereof. For example, the golf ball can include a multi-layer center or cover layer. Where the present inventive ball uses a dual layer center or core, the inner and outer cores may be formed of elastomeric blends as discussed previously. Furthermore, preferably the inner core may be significantly softer than the outer core, while the complete core is still soft with a compression of less than about 75. Therefore, this invention is not to be limited to the specifically preferred embodiments depicted therein.

What is claimed is:

1. A golf ball comprising:
   a center having a compression of less than about 75 and a diameter between about 1.55 inches and about 1.60 inches and comprising greater than about 2.2 parts pentachlorothiophenol or a salt thereof; and
   at least one cover layer surrounding the center, the cover layer being formed of an ionomer component and a metallocene polymer component, having a Shore D hardness on the ball of less than about 58, and having a water vapor transmission rate of less than about 12.62 g/100 in$^2$-day;
   wherein the golf ball has an outer diameter of about 1.68 inches and the cover layer comprises about 50% to about 70% of the ionomer component and about 50% to about 30% of the metallocene polymer component.

2. The golf ball of claim 1, wherein the center has a compression of between about 63 and about 73.

3. The golf ball of claim 1, wherein the cover layer has a Shore D hardness on the ball of less than about 55.

4. The golf ball of claim 2, wherein the cover layer has a Shore D hardness on the ball of between about 50 and about 52.

5. The golf ball of claim 1, wherein the ionomer component is a single ionomer.

6. The golf ball of claim 1, wherein the ionomer component includes the ionomer selected from the group including: a sodium ionomer, a magnesium ionomer, a zinc ionomer, and a lithium ionomer.

7. The golf ball of claim 6, wherein the ionomer component includes at least two different ionomers.

8. The golf ball of claim 6, wherein the ionomer component includes at least three different ionomers.

9. The golf ball of claim 1, wherein the compression of the golf ball is greater than about 70.

10. A golf ball having a compression of about 70 to about 80, comprising:
    a center having a compression of about 63 to about 75 and comprising greater than about 2.2 parts pentachlorothiophenol or a salt thereof; and
    at least one cover layer surrounding the center, the cover layer being formed of at least one ionomer and at least one metallocene polymer, having a Shore D hardness on the ball of less than about 58, and having a water vapor transmission rate of less than 12.62 g/100 in$^2$-day;
    wherein the golf ball has an outer diameter of about 1.68 inches and the cover layer comprises about 50% to about 70% of the ionomer component and about 50% to about 30% of the metallocene polymer component.

11. The golf ball of claim 10, wherein the compression of the golf ball is between about 74 and about 80.

12. The golf ball of claim 10, wherein the center includes polybutadiene, zinc diacrylate, a free radical initiator, zinc oxide, and a filler.

13. The golf ball of claim 12, wherein the polybutadiene has a Mooney viscosity between about 40 and about 60.

14. The golf ball of claim 12, wherein the polybutadiene is a blend of a first and second polybutadiene, the first polybutadiene having a Mooney viscosity between about 30 and about 50 and the second polybutadiene having a Mooney viscosity between 50 and about 70.

15. The golf ball of claim 12, wherein the filler is selected from the group consisting of metal powder, metal alloy powder, metal oxide, metal stearates, particulate carbonaceous materials, tungsten, barium sulfate, iron, manganese, magnesium, copper, and tungsten trioxide.

16. A two-piece golf ball having a compression of about 70 to about 80, comprising:
    a center having a compression of less than about 75 and a diameter between 1.55 inches and about 1.60 inches, and comprising greater than about 2.2 parts pentachlorothiophenol or a salt thereof; and
    a single cover layer surrounding the center, the cover layer being formed of a lithium ionomer and a metallocene polymer, having a Shore D hardness on the ball of less than about 58, and having a water vapor transmission rate of less than 12.62 g/100 in$^2$-day;
    wherein the golf ball has an outer diameter of about 1.68 inches and the cover layer comprises about 50% to about 70% of the ionomer component and about 50% to about 30% of the metallocene polymer component.

* * * * *